United States Patent [19]
Graefnitz et al.

[11] 3,787,766
[45] Jan. 22, 1974

[54] METER MAGNET WITH STRIP-WOUND CURRENT COIL

[75] Inventors: Russell F. Graefnitz, Lafayette; Glenn G. Lohrman, Delphi, both of Ind.

[73] Assignee: Duncan Electric Company, Inc., Lafayette, Ind.

[22] Filed: Feb. 22, 1972

[21] Appl. No.: 228,094

[52] U.S. Cl. ............................... 324/137, 336/192
[51] Int. Cl. ....................... G01r 11/06, H01f 15/10
[58] Field of Search ..... 324/137; 336/192, 199, 223

[56] References Cited
UNITED STATES PATENTS

| | | | |
|---|---|---|---|
| 3,070,766 | 12/1962 | Purdy | 336/199 X |
| 2,156,461 | 5/1939 | Rittenhouse | 336/192 X |
| 3,495,327 | 2/1970 | Eisler | 336/223 X |
| 3,287,681 | 11/1966 | Caldwell | 336/192 |
| 3,551,810 | 12/1970 | Zisa et al. | 324/138 X |

FOREIGN PATENTS OR APPLICATIONS

| | | | |
|---|---|---|---|
| 1,194,052 | 1/1963 | Germany | 324/137 |

Primary Examiner—Alfred E. Smith
Attorney, Agent, or Firm—Howard H. Darbo et al.

[57] ABSTRACT

The coils for a meter current magnet are each formed from a strip of copper, with insulative coating, wound upon itself. A lead-in from its inner end is formed by the strip itself which is extended out around the coil. Flat bends (within the plane of the portion of bent strip) are made possible by forming the blank for the coil with parallel slots in the area to be thus bent. A tie for the outer layer comprises a tongue on the next layer extending through a slot in the outer layer, insulated from it by a plastic sleeve. The wound coils are insulatively coated and insulated from the magnet core and protected from its edges by molded nylon isolators of split-sleeve nature which, in final positioning, are interlocked with the coils for mutual positioning. The coil is outstandingly economical of copper without overheating.

10 Claims, 10 Drawing Figures

PATENTED JAN 22 1974　　3,787,766
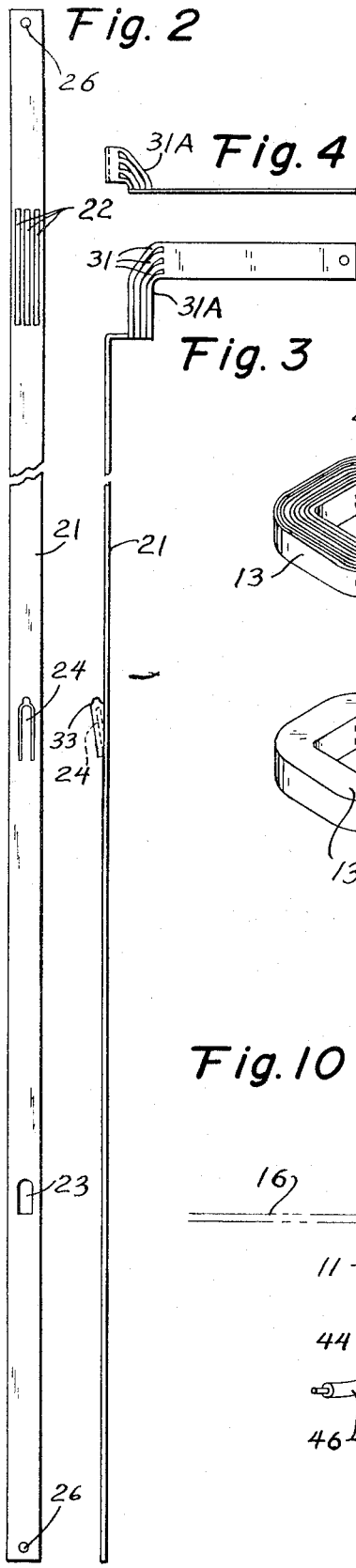
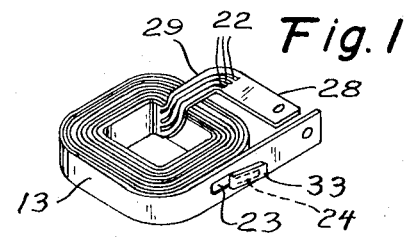
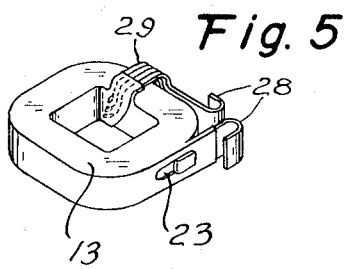
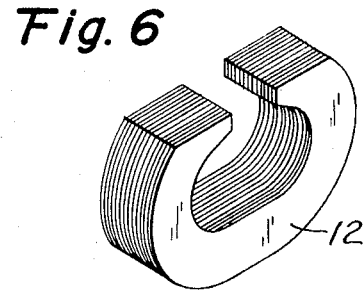
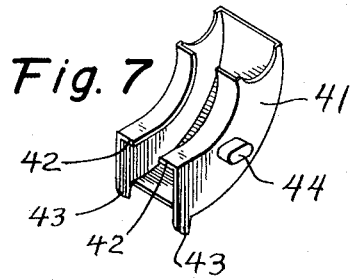
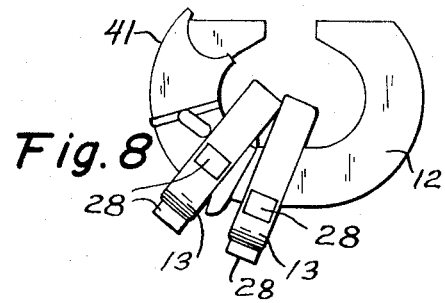
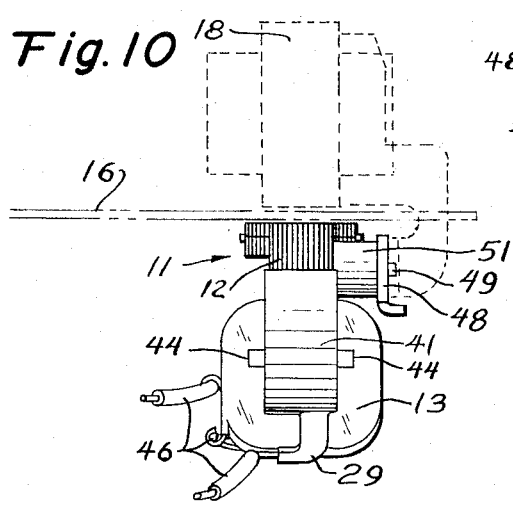
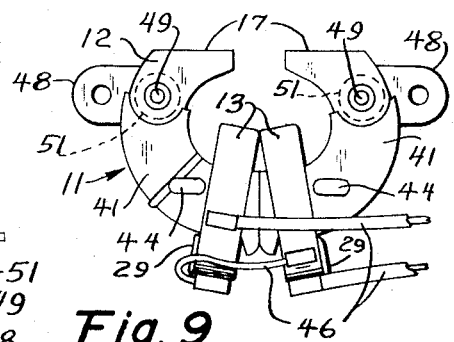
INVENTOR.
RUSSELL F. GRAEFNITZ
GLENN G. LOHRMAN
BY Darbo Robertson
& Vandenburgh
attys.

3,787,766

METER MAGNET WITH STRIP-WOUND CURRENT COIL

The invention of which the present disclosure is offered for public dissemination in the event that adequate patent protection is available is especially suitable for watt-hour meters, the ordinary electricity meter familiar to the homeowner. More particularly the invention relates to the current coils of such a meter, the coils which must carry the current of the metered circuit through the meter.

Because the current coils carry the full current being metered, the wire or conductor of which the coil is formed must have sufficient cross section, considered with heat dissipation, not be be heated to excessive temperatures by the passage of the current. To induce sufficient magnetism to develop a substantial torque tending to rotate the disk (as is needed for accuracy) the coils of lighter-duty meters must have a substantial number of turns. The problem of finding room for this number of turns has been aggravated by reductions in the size of the core on which the coils are positioned. The avoidance of excessive temperatures has seemed to require certain wire sizes inexorably. Even "lighter-duty" meters may be subjected to loads up to 800 percent of their nominal ratings of 2½ amperes. According to the present invention the available space is very satisfactorily utilized, and temperature limitations are economically met, by strip wound coils, which are made practicable by solving some attendant problems. The improved strip wound coils are expected to have other uses.

One problem which is inherent in the use of strip wound coils is making the connection to the inner end of the coil. An internal terminal would space the first turn further from the core and thus make every turn longer, increasing the length of copper; hence also increasing the cost, the resistance and the heat production. This problem is very nicely solved by one aspect of the present invention by extending the strip itself, without a space-increasing fold, out to the periphery of the coil as a lead-in. 90° flat bends (i.e., in the plane of the strip) are made possible by slitting the strip longitudinally in the area to be thus bent and using two opposite-direction bends so that the narrow webs separated by the slitting can remain equal in length.

Another problem in providing such coils is that of securing the outermost winding. Another aspect of the invention, a preferred solution of this problem, is to provide a narrow tongue extending out from the next turn through a slot in the outer turn, the tongue carrying a plastic sleeve with a melting point high enough to safely withstand temperatures resulting from soldering a circuit wire to the terminal near the slot.

Additional problems have been solved by providing molded nylon isolators of split sleeve nature, but shaped to fit the core and to provide special interlocking with the coils. After one of these has been snapped around the stack of laminations which will form the core, the two coils can be slipped on and shoved to one side until a second molded insulator is snapped in place, the parts then being slid to their final position in which formations of the insulators interlock with the coils for mutual retention and proper positioning.

Objects and advantages of the invention may be more fully appreciated from the following description and from the drawings.

DESIGNATION OF FIGURES

FIG. 1 is a pictorial view of a nearly completed coil according to the present invention.

FIG. 2 is a flat-face view of a blank used in the structure of FIG. 1, most of its length being broken away at an intermediate point.

FIGS. 3 and 4 are side and top views respectively of the structure of FIG. 2 after being shaped to form the lead-in for the inner end.

FIG. 5 is a pictorial view of the completed coil (after forming of terminals and plastic coating, as compared to FIG. 1).

FIG. 6 is a pictorial view of a stack of laminations to which two coils as shown in FIG. 5 are to be applied.

FIG. 7 is a pictorial view of an isolator to insulate and position one of the coils on the stack of FIG. 6, two such isolators being used.

FIG. 8 is a front view of the stack of FIG. 6 with one isolator and both coils applied thereto and moved to the left to make room for the right hand isolator to be worked into place.

FIG. 9 shows the completed assembly following from FIG. 8.

FIG. 10 shows an end view of the structure shown in FIG. 9 with other closely associated parts of a meter indicated in broken lines.

DESCRIPTION OF PERTINENT PORTIONS OF METER

The invention is especially suitable for a watt-hour meter's current magnet 11 such as is shown in FIGS. 9 and 10. It is sufficient to explain that this current magnet includes a main stack of laminations 12, seen best in FIG. 6, which is to be energized by a pair of coils 13 both mounted on and surrounding the laminations 12 as seen in FIG. 9; one of the coils being seen best in FIG. 5. FIG. 10 shows the current magnet 11 with the coils 13 mounted on the intermediate portion of a stack of laminations 12 of "C" shape, and insulated therefrom by isolators 41, located below and adjacent a meter disk 16. The upper faces 17 of the laminations 12 are pole faces of the electromagnet when it is energized by the coils 13 and are positioned to face the disk 16 from one side. Those acquainted with the theory of watt-hour meters will recognize that the poles 17 would cooperate with a voltage or potential magnet 18 having its main pole facing the disk from the other side, centered between the two poles 17, to drive the disk 16. The disk is retarded by a permanent magnet not shown so that its speed of rotation is equal to the power used in the metered circuit. The total energy used between meter readings is represented by the number of times the disk 16 turns, translated into kilowatt hours by the register which the meter reader reads.

CONSTRUCTION OF COIL

The coil of FIGS. 1 and 5 is constructed mainly from a blank as shown in FIG. 2. The blank of FIG. 2 is for the most part a long strip 21 of copper, preferably rounded on its edges. Near the end which will be the inner end of the copper coil, three slots 22 have been produced by a stamping operation. The stamping operation has also produced a locking slot 23, a locking tongue 24 and at each end a terminal aperture 26.

The slots 22 are a great aid in an exceptionally satisfactory solution of making the circuit connection to the inner end of the coil. As seen best in FIG. 1, this inner end is bent in the slotted portion thereof so that it can extend out and form its own terminal portion 28 and lead-in portion 29. To appreciate the value of the slots 22 it is necessary to recognize that in FIG. 1 there are two flat bends, that is, bends which are in the plane of the flat side of the strip. Bends away from this plane, such as the coiling or curling of the coil upon itself or the forming of the terminal portions 28 as seen in FIG. 5 present no problem. But flat bends in the direction of its 1/4 inch width have presented a problem which from a practical standpoint was insurmountable. The nearest practical approach to it has been to double the strip back upon itself at a 90° angle forming a fold at 45°. One objection to doing this is that it makes extra thickness at the point of the fold and this necessitates a little extra length in each of the turns laid over it. Minimum turn length is a recognized aim for coils in general. Indeed, one great advantage of the flat strip type of coil illustrated is that it has shorter average turn length than any other comparable type of coil, when space does not permit side by side or helically wound turns.

One of the flat bends is seen in face view in FIG. 4 and the other in face view at the top of FIG. 3. The slots permit the flat bends partly by letting the remaining narrow webs 31 (FIG. 3) readjust themselves in ways which they could not do without the slots. They can shorten the relative turn distances by crowding together and when as here there are two slot bends in opposite directions they can readjust longitudinally. Thus the narrow web which forms the inside bend shown in FIG. 3 and therefore at that point requires the least length has been marked 31A and this same narrow web is seen in FIG. 4 to be the outside bend requiring at that point the greatest length. It is best to form the two flat bends at the same time before any transverse bends in the slotted area are formed. The forming of the transverse bends thereafter presents no problem and has no effect on the flat bends. Thus comparing FIGS. 1 and 5 it is apparent that another transverse bend from FIG. 1 to fold the lead-in portion 29 around the edge of the coil 13 will be very easy. In case the extensive slots 22 might not always be burr-free, the coil is wound burr-side in, so that any burrs in lead-in portion 29, where it extends along the side of the coil, will not project toward the edges of the other turns. Also this lead-in portion 29 is slightly spaced from the other turns so that the later fluidized-coating mentioned below will form a layer of insulation between them.

The slot 23 and tongue 24 of FIG. 2 provide a preferred manner of holding the coil tightly wound, as best seen in FIG. 1. The tongue 24 is bent outwardly as seen in FIG. 3 and a thin heat-resistant plastic tube 33 slipped over it. As the last turn of the coil is wound, the tongue 24 protected by its plastic tube, is slipped through slot 23, and (with the last turn drawn taut) the tongue is bent back as seen in FIG. 1, bearing on the base of slot 23, to hold the last turn snugly against the preceding turn. The tongue is flattened down so that if slipping between slot and tongue should occur, the last turn will still be held down against the prior turn. The spacing of the base of tongue 24 from the far end of slot 23 (before winding the coil) should be slightly less than the length of this last turn so that the bend in tongue 24 will occur intermediate its length where it is protected by the plastic tube, the tube bending with it. The tetrafluoroethylene plastic sold under the trademark "Teflon" has been found suitable for this tube 33.

The turns of coil 13 are preferably insulated from one another by a thin coating applied any time before winding the coil. Coated copper strip can be purchased if desired. The preferred strip treatment is to electrophoretically deposit an insulating epoxy paint on the strip after the punching operation, preferably protecting the terminal ends. Instead of using coated copper, insulating tape may be wound with the coil, Minnesota Mining & Manufacturing No. 75 double-faced insulating tape (thermosetting adhesive on both faces) being suitable for this purpose. In that event the width of tape should be slightly less than the width of copper so as not to interfere with later application of insulation to the outside of the coil.

The wound coil as shown in FIG. 1, but with its terminal ends protected, is preferably coated with insulation by a fluidized bed technique using an epoxy resin, the coated coil being shown in FIG. 5.

Other means than tongue 24 may be used for holding the coil tightly wound. If the double-faced adhesive mentioned is used, it is sufficient, afer curing. Both this and a nylon rivet were used before the tongue and slot feature was originated as the preferred form of the present invention.

ASSEMBLY OF COILS ON LAMINATIONS

The assembly of the coils 13 on the stack of laminations 12 and the proper insulating and positioning thereof have become quite simple with the aid of isolators 41 of the split-sleeve type seen best in FIG. 7. They are of thin molded nylon (e.g., 0.020 inch) and therefore take up almost no space and are easily spread open enough to slip over the stack 12 by flanges 42. After one of the isolators 41 has thus been applied and both of the coils 13 applied (each being slipped through the gap of the stack and worked from the opposite poles around to the base) all three parts are shoved over to one side as seen in FIG. 8 and the second isolator 41 spread open and worked into place. Thereupon the first three parts are moved back to their proper positions as seen in FIG. 9.

Nylon isolator 41 is provided with two outwardly extending ears 43. To work the isolator through its coil these are manually held bent over, springing out again after they pass through the coil. Thus they substantially prevent movement of the coils toward one another from their desired position shown in FIG. 9. Movement of the coils away from one another is limited by lugs 44, molded on opposite sides of each of the isolators 41. The isolators, in turn, are restrained from more than slight movement apart by shoulders 51 as described below. The flanges 42 of each isolator 41 (and the gap between these flanges) are above the intermediate portion of the stack 12, while the lead-in portions 29 bend out at points below the stack 12 where the isolators are uninterrupted. This gives safe insulation at this relatively vulnerable point.

The shortness of average length of turn is the result of contributions from moderate snugness of the inside turn around the stack 12, the thin strip nature of the coil and the use of very uniform insulative coating that may separate the turns by only about 0.002 inch. After the parts have been assembled as so far described, proper conecting conductors 46 are soldered to the terminal portions 28, the terminal portions 28 preferably having been bent to loop form as seen in FIG. 5. The connections 46 shown are for a two-wire circuit, the two coils being connected in series, and the resulting pair of leads extending to a pair of terminal blades on one side of the meter. For a three-wire circuit, the respective pairs of terminal blades each on one side of the meter would be connected separately, one pair to each coil.

After assembly of the two coils 13 and two isolators 41 on the stack 12, mounting ears 48 are riveted to the stack by shoulder rivets 49. They may be part of additional structure omitted from FIG. 9 for simplicity. The enlarged portions 51 of the shoulder rivets 49 confine the isolators 41 against shifting on stack 12.

ACHIEVEMENT

The coil of the present invention can carry, without overheating, a current amperage which is surprising in the light of the realization that heat production in a given conductor increases with the square of the amperage. The surprising current carrying capacity apparently is achieved by contributions of several factors. Each turn of copper is (except for thin electrical insulation) exposed to cooling at its edges, so that there are no relatively uncooled turns hidden in the center. The maximum snugness of the turns on each other and near-maximum snugness on the core, and the ability to use thin copper because of good cooling, all contribute to shortening total length of copper so that cost is low and less heat has to be dissipated. The snugness is in turn made possible by the use of thin isolators, the factors which make these isolators insertable with only slight clearance, and two factors that avoid wasting space within the coils. These two factors are the flat bends of the lead-ins (no double thickness) and the locking of the outer turns to each other (no ties or bands extending into the eye of the coil). The flat bends at the same time contribute to locating terminals of socket-like nature at the most convenient peripheral points of the coils so as to facilitate connecting to heavy conductors (that produce so little heat they can help dissipate coil heat). The ease of forming, partly because of the flat bends, contributes to low cost of production, even though the small amount of copper used is the main factor.

A 20-turn coil (i.e., two 10-turn coils substantially as illustrated in FIG. 5, and connected in series as in FIG. 9) made with a ribbon cross section of about 7,790 circular mils and No. 12 copper leads has been tested and found to be able to take 10 amperes continuous A.C. current with a temperature rise (at a mid-point presumed hottest) less than 20° C. The actual measurement was 17°, but 20° allows for possible error or possible variations between coils. A 56° C. rise was encountered in a round wire coil of about 5,180 circular mils, No. 13 leads, and 51° C. in a ribbon-wound coil of a few more turns of about 5,411 circular mils but lacking features of this invention. Raising the amperage to 20° on the test coil of this invention only caused a temperature rise read at 54° C., although four times as much heat was being produced as with the same coil at 10 amp.

Reference to the laminations as "C" shaped is not intended to distinguish from "U" shaped, a "U" being merely a deeper "C".

We claim:

1. A current magnet for watt-hour meters including a stack structure having laminations of generally "C" shape providing two poles with faces positioned to face a meter disk and a core magnetically connecting them, a pair of strip-wound coils surrounding the core, and a pair of flexible molded plastic isolators of single sleeve nature largely surrounding the core, insulating all corners thereof from the coils, and molded with projections thereon which interfit with the coils to position the coils and also molded with portions interengaging formations of the stack structure to substantially eliminate shifting of the coils along the core.

2. A current magnet for watt-hour meters including a stack structure having laminations of generally "C" shape providing two poles with faces positioned to face a meter disk and a core magnetically connecting them, a pair of strip-wound coils surrounding the core, and a pair of flexible molded plastic isolators largely surrounding the core, insulating all corners thereof from the coils, and molded with projections thereon which interfit with the coils to position the coils and also molded with portions interengaging formations of the stack structure to substantially eliminate shifting of the coils along the core;

the isolators being of split sleeve nature for clipping around the core separately, and at least one of the projections being deformable to facilitate relative movement of the parts during assembly.

3. A current magnet for watt-hour meters including a stack structre having laminations of generally "C" shape providing two poles with faces positioned to face a meter disk and a core magnetically connecting them, a pair of strip-wound coils surrounding the core, and a pair of flexible molded plastic isolators of single sleeve nature largely surrounding the core, insulating all corners thereof from the coils, and molded with projections thereon which interfit with the coils to position the coils and also molded with portions interengaging formations of the stack structure to substantially eliminate shifting of the coils along the core;

the strip-wound coils fitting the core and isolators with reasonable snugness and including a lead-in portion for the inner end of the strip comprising a portion of this strip which has been slotted and provided with a flat bend in the slotted area which extends the lead-in portion as a single thickness of the strip laterally from within the coil.

4. A current magnet for watt-hour meters including a stack structure having laminations of generally "C" shape providing two poles with faces positioned to face a meter disk and a core magnetically connecting them, a pair of strip-wound coils surrounding the core, and a pair of flexible molded plastic isolators of single sleeve nature largely surrounding the core, insulating all corners thereof from the coils, and molded with projections thereon which interfit with the coils to position the coils and also molded with portions interengaging formations of the stack structure to substantially eliminate shifting of the coils along the core;

the strip-wound coils fitting the core and isolators with reasonable snugness and including a lead-in portion for the inner end of the strip comprising a portion of this strip which has been slotted and provided with a flat bend in the slotted area which extends the lead-in portion as a single thickness of the strip laterally from within the coil; the coil being held snugly wound by interlocking means between the outer and next outer turns.

5. A strip-wound coil comprising a strip of highly conductive metal wound upon itself to form a coil and with a lead-in comprising an extension from the inner end slotted lengthwise thereof to provide a plurality of webs narrow in strip-width direction and provided in the slotted area with a flat bend which, as a single thickness of the strip, extends laterally out from within the coil.

6. A strip-wound coil comprising a strip of highly conductive metal wound upon itself to form a coil and with a lead-in comprising an extension from the inner end slotted lengthwise thereof to provide a plurality of webs narrow in strip-width direction and provided in the slotted area with two oppositely directed flat bends, one of which, as a single thickness of the strip, extends laterally out from within the coil.

7. A strip-wound coil comprising a strip of highly conductive metal wound upon itself to form a coil and with a lead-in comprising an extension from the inner end slotted lengthwise thereof to provide a plurality of webs narrow in strip-width direction and provided in the slotted area with a flat bend which, as a single thickness of the strip, extends laterally out from within the coil; the remainder of the lead-in extending along the side face of the coil, and laterally back to lie along the outside of the coil.

8. A strip-wound coil comprising a strip of highly conductive metal wound upon itself to form a coil and with a lead-in comprising an extension from the inner end slotted lengthwise thereof to provide a plurality of webs narrow in strip-width direction and provided in the slotted area with two oppositely directed flat bends, one of which, as a single thickness of the strip, extends laterally out from within the coil; the remainder of the lead-in extending along the side face of the coil, and laterally back to lie along the outside of the coil, with the second flat bend turning the strip lengthwise of the wound strip so that curling its end provides a transverse terminal socket.

9. A strip-wound coil comprising a strip of highly conductive metal wound upon itself, a slot formed in the outer turn of the coil, and a tongue formed in the next turn of the coil and projecting through the slot, an insulating sleeve extending along the tongue through the slot, said tongue together with said sleeve being doubled back at an intermediate point in the length of the tongue about an edge of the slot to secure the outer turn snugly around the next turn.

10. A current magnet for watt-hour meters including a stack structure having laminations of generally "C" shape providing two poles with faces positioned to face a meter disk and a core magnetically connecting them, a pair of strip-wound coils surrounding the core, and a pair of flexible molded plastic isolators largely surrounding the core, insulating all corners thereof from the coils, and molded with projections thereon which interfit with the coils to position the coils and also molded with portions interengaging formations of the stack structure to substantially eliminate shifting of the coils along the core;

the strip-wound coils fitting the core and isolators with reasonable snugness and including a lead-in portion for the inner end of the strip comprising a portion of this strip which has been slotted and provided with a flat bend in the slotted area which extends the lead-in portion as a single thickness of the strip laterally from within the coil; said coil having a maximum temperature rise of less than 20° C. from continuously carrying a 10 amp. alternating current.

* * * * *